O. H. JOBSKI.
VEHICLE WHEEL RIM.
APPLICATION FILED JULY 30, 1917.
1,347,581.
Patented July 27, 1920.
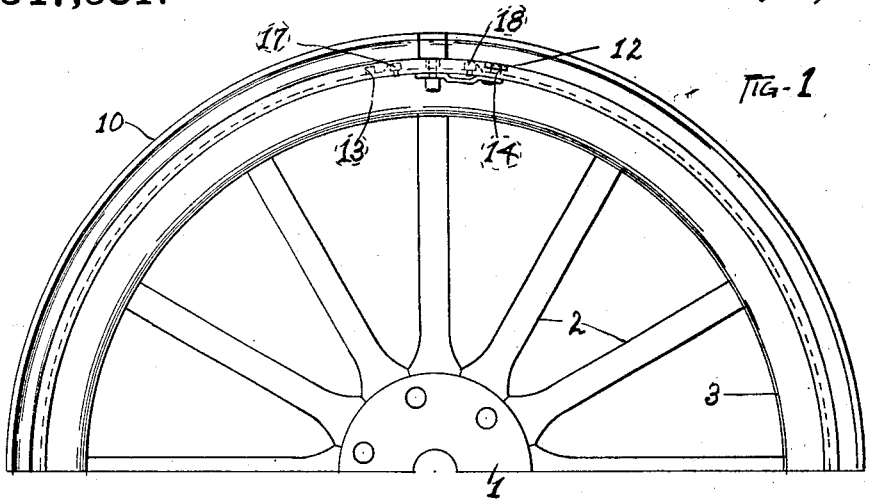
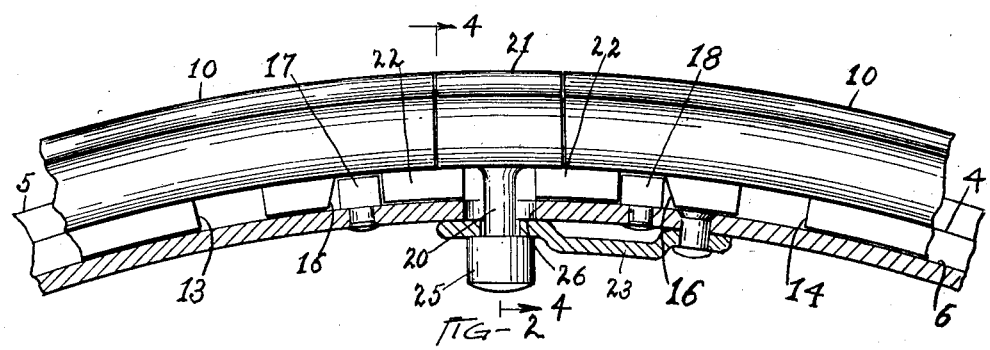
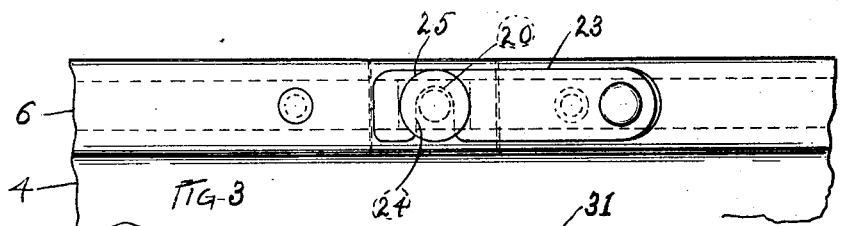
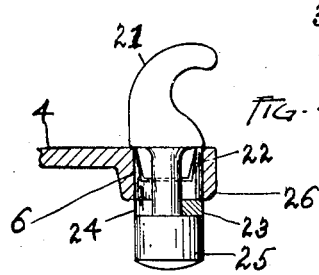
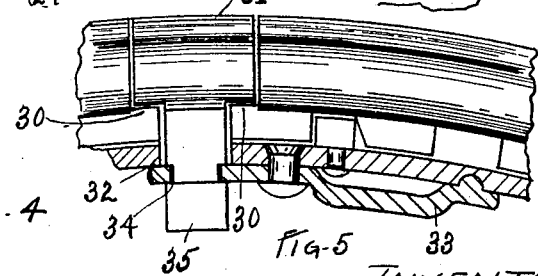
INVENTOR
Otto H Jobski
BY Fay, Oberlin & Fay
ATTORNEYS.

UNITED STATES PATENT OFFICE.

OTTO H. JOBSKI, OF CLEVELAND, OHIO, ASSIGNOR TO THE STANDARD PARTS COMPANY, OF CLEVELAND, OHIO, A CORPORATION OF OHIO.

VEHICLE-WHEEL RIM.

1,347,581.   Specification of Letters Patent.   Patented July 27, 1920.

Application filed July 30, 1917. Serial No. 183,393.

*To all whom it may concern:*

Be it known that I, OTTO H. JOBSKI, a citizen of the United States, and a resident of Cleveland, county of Cuyahoga, and State of Ohio, have invented a new and useful Improvement in Vehicle-Wheel Rims, of which the following is a specification, the principle of the invention being herein explained and the best mode in which I have contemplated applying that principle, so as to distinguish it from other inventions.

The present improvements have as their object the simplification of so-called "Q. D." or quick detachable rims for pneumatic tires, such as are largely used in connection with automobiles and the like. It will be understood of course that the trade designation "quick detachable" does not refer to the rim proper, but rather to a side-flange on such rim which is rendered detachable in order to facilitate the placing of a tire on, or its removal from, the rim. The present improvements relate more especially to that type of detachable side flange, or ring, which is transversely split in order to permit it to be taken off and put on the rim, and to the locking device for securing the ends thereof in place when the flange is in operative position.

To the accomplishment of the foregoing and related ends, said invention, then, consists of the means hereinafter fully described and particularly pointed out in the claims.

The annexed drawing and the following description set forth in detail certain mechanism embodying the invention such disclosed means constituting, however, but one of various mechanical forms in which the principle of the invention may be used.

In said annexed drawing:—

Figure 1 is a side elevational view of a portion of a wheel showing a Q. D. rim thereon embodying my present improved structure; Fig. 2 is a side elevational view of the meeting ends of the split side-flange, or ring, with the locking device shown in operative position, the adjacent portion of the rim appearing in section; Fig. 3 is a bottom plan view of the same parts as appear in Fig. 2; Fig. 4 is a transverse section of the locking device and adjacent portion of the rim taken on the plane indicated by the line 4—4, Fig. 2; and Fig. 5 is a side elevational and sectional view similar to Fig. 2, but showing a modification in the construction of the locking device.

The construction of the wheel body, which is illustrated in part only in the aforesaid drawing, is a matter of indifference so far as the present invention is concerned, consisting, as shown, of the usual hub 1, spokes 2, and felly 3. The rim 4, which surrounds such felly, is preferably of the so-called "universal" type; that is it is provided with an abutment 5 around its rear edge (see Fig. 2), adapted to retain in place a continuous side flange or ring (not shown), which may be reversed to receive and hold either a straight side or clencher tire as desired. On the other hand, such rim may of course be provided with an integral side flange on such rear edge of either the straight side, or clencher, type.

The front edge of the rim 4 is provided with an encircling groove or depression 6, conveniently formed by beading such edge, the outer wall 7 of the groove lying flush or slightly below the outer cylindrical surface of the rim, so as to permit the aforesaid reversible side flange (when one is used), to be slipped over it as occasion may require.

The part of the structure of present interest is the outer flange 10, which, as previously indicated, is transversely split at one point in its circumference, in order that it may be detachably secured to the rim, such flange having its inner edge 11 formed to seat in the aforesaid groove or depression 6, but being sufficiently resilient to permit its ends to be separated and the ring thus expanded until it can be removed from such groove. One end (the right as shown in Fig. 1), is most conveniently pried out first, the outer wall of the groove being cut away at 12 to permit the insertion of a screw-driver or like implement (see Fig. 1), and the inner edge 11 of the ring, which seats in the groove, being cut away at points 13 and 14, spaced a corresponding distance from the respective ends, with the same object in view. This edge is also cut away at other points 15 and 16, likewise symmetrically located with respect to the split in the ring, and illustrated as being a trifle nearer such split than the notches 13 and 14 just referred to, such cut away portions or notches 15 and 16 being adapted to interchangeably engage with lugs 17 and 18 riveted or otherwise formed in the bottom of the groove 6.

From the foregoing construction, it follows that when the ring or flange 10 is seated in the groove 6 with its ends in juxtaposition, not only is such flange held against circumferential displacement about the rim, but if such ends be secured against displacement radially outwardly, the flange as a whole will be effectually locked to the rim.

In order thus to secure such flange ends to the rim, the locking device, one form of which is shown in detail in Figs. 2, 3 and 4 and a modification in Fig. 5, is provided. Referring to the first form of the device, the main element will be seen to comprise a member having a short stem or shaft 20 and a rectangularly shouldered head 21 on its upper end, such head also being of rectangular form in plan view (see Fig. 3), while in cross-sectional form it is the same as that of the side flange or ring itself (see Fig. 4). This head 21 is in effect a short section of the flange or ring itself, with the omission of the inner edge 11 formed on the latter. This inner edge is extended at the split in the flange from both ends so as to form projections or toes 22, as best shown in Fig. 2, and the head 21 of the locking member overlaps these projections or toes sufficiently to prevent displacement of the flange ends when said member is in turn locked in place.

Locking of the member is effected by means of a pivotal latch 23 attached to the under side of the bead 6 or other conveniently accessible portion of the rim, and formed with a notch or recess 24 near its free end that is adapted to engage the shank 20 of the locking member just above the knob or smaller head 25 formed on the lower end of the latter, all as clearly shown in Figs. 2, 3 and 4, where the latch or lever 23 is shown in engagement with the locking member proper. By swinging the lever outwardly, as may be conveniently done with a screw-driver, hammer or equivalent implement, the locking member proper may be lifted bodily, a hole 26 in the bottom of the bead 6 permitting the button or head 25 to pass readily therethrough. With this member out of the way, the split flange or ring may be readily removed from the groove or depression 6, as has already been described.

In order again to lock the split flange to the rim it is merely necessary to replace the same in the groove or depression 6, insert the head 25 of the locking member through the hole 26 until the rectangular head 21 of such member engages the projections 22 on the respective ends of the flange, and then swing the latch or lever 23 around into place behind or above said head 25. The locking member may obviously be thus inserted and secured in place with the head 21 directed either inwardly or outwardly to correspond with the direction in which the flange is turned; in other words the latter may be used with either a straight side or clencher tire, and the locking device instantly accommodated thereto.

In the modification illustrated in Fig. 5, I show a split flange in which the projections 30 at the respective ends thereof include a portion of the body of the flange or ring, and not merely the edge 11 which fits in the groove or depression 6. The main head 31 of the locking member is accordingly of less depth, but otherwise is of the same form as in the first described construction. The shank 32 of the member is shown as of thicker and correspondingly more substantial construction. Finally, the latch or lever 33 is shown as having two free ends, the one of which is provided with a hook-like recess 34 adapted to engage the shank behind or above the button or head 35 on its inner end, while the other arm of such latch carries a lug that is adapted to snap into a small recess formed in the under side of the bead 6 so as to insure the lever against accidental displacement. As a matter of fact the first described construction has been found to be entirely satisfactory in this respect, since the hooked end of the lever 23 can be easily formed to bind between the head 25 on the locking member and the under face of the bead 6 sufficiently to prevent such accidental displacement.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a wheel rim; of a split side flange removably mounted on said rim; and means for locking said flange to said rim, said means including a separable member adapted to engage the juxtaposed ends of said flange, and a member movably attached to said rim independently of, but adapted to engage with said first-named member and lock the same to said rim.

2. The combination with a wheel rim; of a split side flange removably mounted on said rim; and means for locking said flange to said rim, said means including a separable member adapted to engage the juxtaposed ends of said flange, and a member pivotally attached to said rim independently of, but adapted to engage with said first-named member and lock the same to said rim.

3. The combination with a wheel rim; of a split side flange removably mounted on said rim; and means for locking said flange to said rim, said means including a member having a shank adapted to project through said rim and having a head adapted to engage the juxtaposed ends of said flange, and a member movably attached to said rim and adapted to engage said shank.

4. The combination with a wheel rim; of a split side flange removably mounted on said rim; and means for locking said flange to said rim, said means including a member having a shank adapted to project through said rim and having a head adapted to engage the juxtaposed ends of said flange, and a member pivotally attached to said rim and adapted to engage said shank.

5. The combination with a wheel rim formed with an encircling groove near one edge and with an aperture at one point in such groove; of a split side flange removably mounted in such groove; and means for locking said flange in place in such groove, said means including a separable member having a shank adapted to project through such aperture and having a head of the same cross-section as said flange adapted to overlie the juxtaposed ends of the same, and a hooked latch pivotally attached to the inner face of said rim and adapted to engage said shank to prevent removal thereof.

6. The combination of a wheel rim; of a split side flange removably mounted on said rim; means for locking said flange to said rim, said means including a separable member adapted to engage the juxtaposed ends of said flange, and a member movably attached to said rim and adapted to interlock with said first-named member and thus secure the same to said rim; and means adapted to retain said second member in such interlocking position.

7. The combination with a wheel rim, of a split side flange removably mounted on said rim; means for locking said flange to said rim, said means including a member having a shank adapted to project through said rim and having a head adapted to engage the juxtaposed ends of said flange, and a member pivotally attached to said rim and adapted to engage said shank; and an extension to said second member adapted to engage said rim to lock said member thus in engagement.

Signed by me, this 25th day of July, 1917.

OTTO H. JOBSKI.